United States Patent Office 3,167,921
Patented Feb. 2, 1965

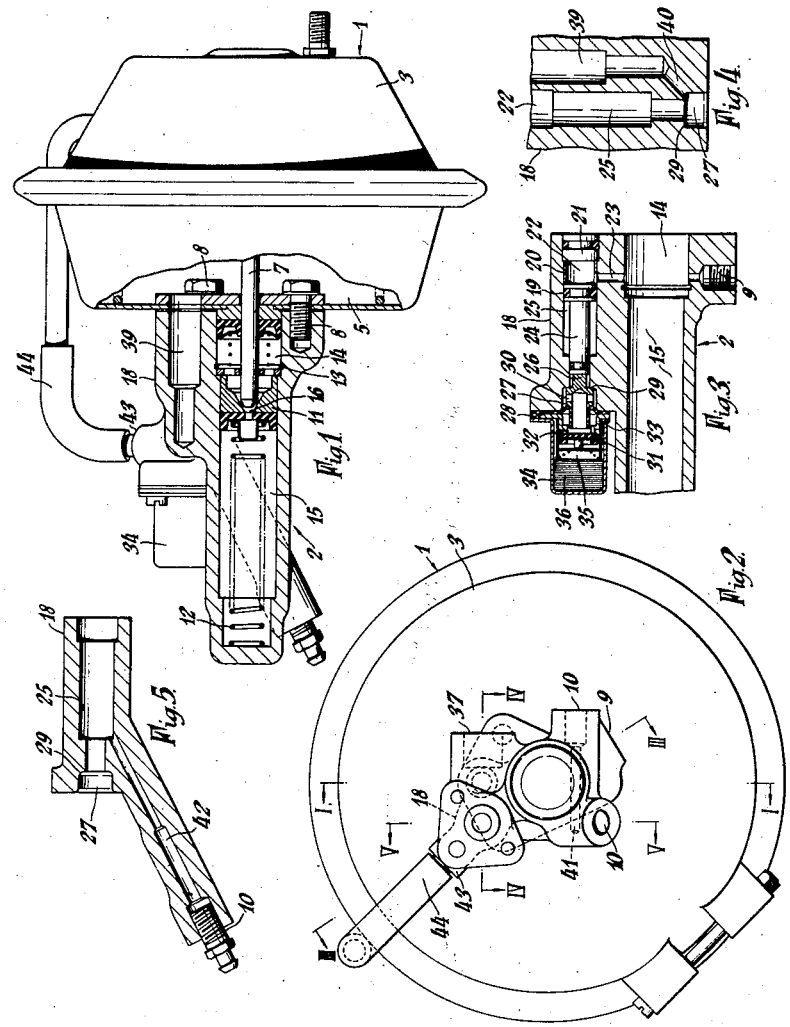

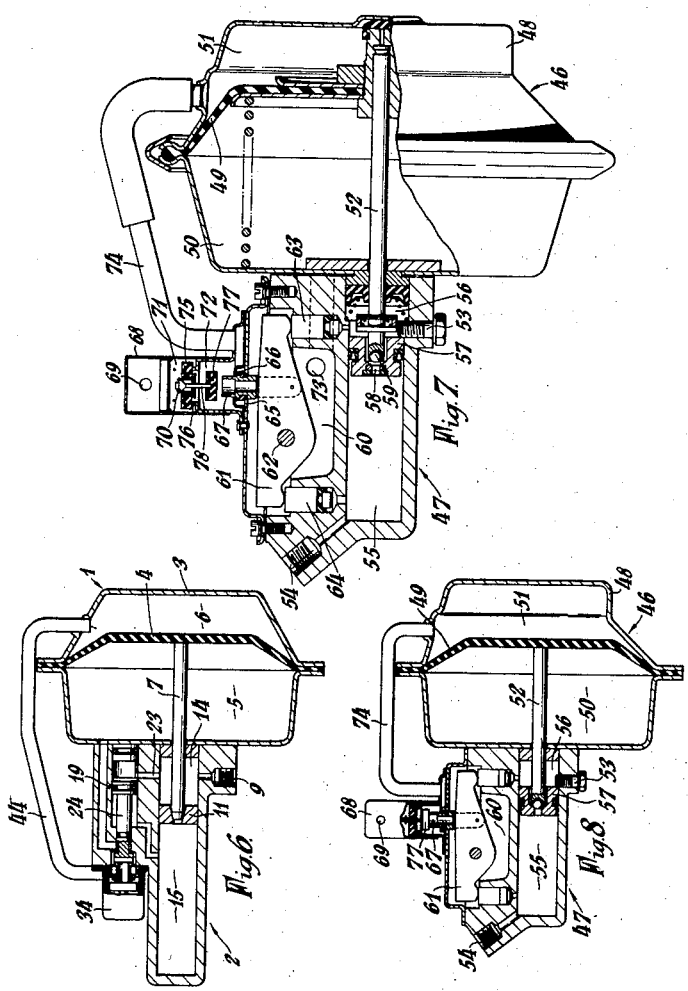

3,167,921
FLUID PRESSURE OPERATED SERVO-DEVICES FOR HYDRAULIC SYSTEMS, PARTICULARLY BRAKING SYSTEMS FOR VEHICLES
Leslie C. Chouings, Leamington Spa, England, assignor to Automotive Products Company Limited, Leamington Spa, England
Filed Mar. 28, 1962, Ser. No. 183,138
Claims priority, application Great Britain, Mar. 29, 1961, 11,510
5 Claims. (Cl. 60—54.6)

This invention relates to fluid pressure operated servo-devices for hydraulic systems, particularly braking systems for vehicles.

The invention has for an object to provide a fluid pressure operated servo-device in which energisation of the servo-device is controlled by a pressure actuated valve of improved construction providing a valve having a low crack point.

In accordance with the invention it is proposed to utilise a valve of the kind in which operation of the valve is dependent upon the pressure generated by manually operated means for example a master cylinder and the pressure produced in the hydraulic system by the servo-device. In a valve according to the invention the pressure produced by the manually operated means is utilised to effect operation of valve operating means the actuation of which results in displacement of a movable valve member from a normally open position to a closed position to interrupt the supply of pressure fluid to one side of the piston of the servo-device and thereafter to continue movement of said movable valve member to effect displacement of a further movable valve member to admit pressure fluid to said one side of the piston of the servo-device to energise the servo-device, the said valve operating means also being sensitive to pressure produced in the hydraulic system, the areas of the valve operating means acted upon by the respective pressures being arranged so that a balance is obtained between input load to output load whereby any increase in input is balanced by an increase in output.

The valve operating means may consist of a piston slidable in a cylinder the area subject to pressure on one side of the piston being greater than the area subject to pressure on the other side of the piston. The side of the piston of larger area is sensitive to pressure created by the master cylinder or other manually operated means, the opposite side of the piston or side of smaller area being sensitive to pressure created in the hydraulic system by operation of the servo-device. The displacement of the valve operating means by pressure on the side of larger area is utilised to effect displacement of movable valve members arranged co-axially with one another and connected in the circuit of the working chamber of the servo-device, the said movable valve members being movable jointly by the valve operating means following movement of one of said movable valve members alone by initial movement of the valve operating means.

In an alternative arrangement according to the invention the valve operating means may consist of a rocker arm which is tiltable in one direction by displacement of a plunger sensitive to pressure created by the master cylinder or other manually operated means and in the opposite direction by a further plunger sensitive to pressure created in the hydraulic system by operation of the servo-device. The tilting movement of the rocker by pressure created by the master cylinder or other manually operated means is utilised to effect displacement of the movable valve members in the circuit of the working chamber of the servo-device and arranged co-axially with one another. In this arrangement the pivotal mounting of the rocker arm is arranged so that the rocker arm can assume a position of balance to obtain balance between the input and output loads.

Embodiments of a vacuum servo-device incorporating the improved valve means and suitable for a hydraulic braking system for vehicles will now be described by way of example by aid of the accompanying drawings, in which:

FIGURE 1 is a view partly in section on the line I—I of FIGURE 2 of a vacuum servo-device and master cylinder combined in a single unit according to one embodiment of the invention, the condition of the apparatus corresponding to the "off" position of the brakes;

FIGURE 2 is an end view as seen from the left of FIGURE 1;

FIGURE 3 is a fragmentary view in section on the line III—III of FIGURE 2;

FIGURE 4 is a fragmentary view in section on the line IV—IV of FIGURE 2;

FIGURE 5 is a fragmentary view in section on the line V—V of FIGURE 2;

FIGURE 6 is a diagrammatic view in section of the unit of FIGURE 1 and showing the condition of the apparatus in the "on" position of the brakes;

FIGURE 7 is a sectional view of a vacuum servo-device and master cylinder combined in a single unit according to a further embodiment of the invention; and FIGURE 8 is a diagrammatic view in section of the unit of FIGURE 7 showing the condition of the apparatus in the "on" position of the brakes.

Referring to FIGURES 1 to 6 of the accompanying drawings the vacuum servo-device 1 and master cylinder 2 are each generally of known construction, the servo-device 1 consisting of a casing 3 the interior of which is divided by a flexible diaphragm 4 to provide a vacuum chamber 5 and a working chamber 6, the diaphragm 4 carrying a push rod 7. The push rod 7 extends into the bore of the master cylinder 2 hereinafter referred to as the servo master cylinder which is mounted on one side of the servo-device casing so as to extend outwardly therefrom co-axial with the push rod the servo-master cylinder being secured by bolts 8. The servo master cylinder 2 has an inlet 9 for connection to a pedal operated master cylinder (not shown) and at its outer end an outlet 10 for connection to the hydraulic circuit of the bakes of a vehicle. The piston 11 of the servo master cylinder is spring loaded by a compression spring 12 the spring action urging the piston 11 to the retracted position shown in FIGURE 1 against a spring retaining ring 13 providing stop means in the bore, to provide the spaces 14 and 15 on either side of the piston respectively which, with the piston in the retracted position, are open to one another through a central aperture 16 in the piston 11. The conical outer end 17 of the push rod 7 forms a closure member for the piston aperture 16 and upon initial movement of the push rod 7 as a result of energisation of the servo-device 1 the said push rod end closes the aperture, further movement causing displacement of the piston 11 to supply pressure fluid from the space 15 to the brake circuit.

Formed integral with the servo-master cylinder is a secondary cylinder 18 the bore of which extends parallel with the bore of the servo-master cylinder. A piston 19 is disposed in the bore of the secondary cylinder the stroke of the piston to the right being limited by a stop provided by a sleeve 20 axially held in position by a bush 21 closing the inner end of the bore. The space 22 behind the piston 19 communicates with the space 14 of the servo-master cylinder 2 through a passage 23 so that hydraulic liquid from the space 14 of the servo-master cylinder enters the space 22 of the secondary cylinder. The side of the piston 19 opposite to the space 22 has a plunger 24 extending axially for a portion of the length of the bore of the secondary cylinder, the plunger forming with the surrounding bore an annular space 25. The outer end of the plunger is arranged opposite to one end of a tubular movable valve member 26 disposed co-axially with the plunger 24 and axially slidable in the portion 27 of the bore. The tubular movable valve member is connected to flexible diaphragm 28 and is resiliently loaded thereby axial movement of the movable valve member being limited by a shoulder 29 in the bore. The spaces on each side of the diaphragm forming the bore portion 27 are open to one another through the tubular movable valve member 26 and the radial drillings 30 therein. The outer end of the valve member 26 faces a disc valve 31 held against a seating 32 by a spring 33, the seating 32 being formed in a seating member 33 held in position by an end cover 34 closing the outer end of the bore of the secondary cylinder. The interior 35 of the end cover 34 is open to atmosphere through apertures in the same an airfilter 36 being provided to filter the incoming air.

The body of the master cylinder 2 has an inlet port 37 for connection to a source of vacuum, the inner end of the port opening into a passage 39 one end of which is open to the space 5 on one side of the diaphragm 4 of the servo-device 1. The passage 39 also communicates with the bore space 27 of the secondary cylinder through a passage 40 as shown in FIGURE 4. The outlets 10 to the brakes are interconnected with one another, and with the servo-master cylinder bore space 15 by drilling 41, the said bore space also being in communication with the annular space 25 in the secondary cylinder through a passage 42 as shown in FIGURE 5. A further port 43 in the body of the secondary cylinder is connected by a pipe 44 to the space 6 on one side of the diaphragm 4 of the vacuum servo-device the port 43 being in communication with the bore space 27 of the secondary cylinder through a passage not shown.

FIGURE 1 shows the condition of the apparatus in the brake "off" position, and FIGURE 6 the brake "on" condition. When the pedal operated master cylinder is actuated to apply the brakes hydraulic fluid under pressure entering the space 14 of the servo-master cylinder and passes into the space 22 of the secondary cylinder and acts on the full cross-sectional area of the piston 19 with the result that the piston is displaced in a direction towards the tubular movable member 26, continued movement in this direction causing the plunger 24 to contact the tubular movable member 26 which is thus also displaced axially to unseat the disc valve 31 and permit air to enter the working chamber 6 of the servo-device the air passing from the interior space 35, through the seating 32 into bore space 27 to pipe 44. The servo-device is thus energised the resulting movement of the push rod 7 causing initially closure of the aperture 16 in the master cylinder piston 11 whereby the pressure in the space 15 on the side of the master cylinder piston connected to the brakes increases as the brakes are applied. This pressure enters the annulus 25 in the secondary cylinder 18 and acts on the side of the piston which due to the provision of the plunger 24 is of smaller cross sectional area than the other side of two areas being arranged so that a balance between input load to output load is attained. As the disc valve 31 and the diaphragm 28 associated with the movable member are of small size in relation to the piston 11 of the servo master cylinder a low crack point for the valve is obtained.

In the further embodiment shown in FIGURES 7 and 8 an alternative form of valve construction is disclosed. According to this embodiment the vacuum servo-device 46 and servo-master cylinder 47 are each generally of known construction, the servo-device, as in the previous embodiment consisting of a casing 48 the interior of which is divided by a flexible diaphragm 49 to provide a vacuum chamber 50 and a working chamber 51, the diaphragm 49 carrying a push rod 52. The push rod 52 extends into the bore of the servo operated master cylinder, which is mounted on one side of the casing 48 of the servo device so as to extend outwardly therefrom co-axial with the push rod. The servo master cylinder has an inlet 53 at its end adjacent the servo-device for connection to a pedal operated master cylinder and at its end remote from the servo device, or outer end, an outlet 54 for connection to the hydraulic circuit of the brakes of a vehicle. The spaces 55 and 56 in the bore of the servo master cylinder on either side of the piston 57 thereof are in communication with one another when the said piston is in the retracted position through a central aperture 58 in the piston which is closable by a ball 59 carried by the outer end of the push rod 52 upon initial movement of said push rod as a result of energisation of the servo-device.

A chamber 60 is provided at one side of the servo master cylinder in which is located a rocker 61 which is tiltable about a pivotal axis 62 disposed at right angles to the bore axis of the servo master cylinder. Each end of the rocker bears against a plunger 63, 64 respectively the rocker being tiltable in one direction by displacement of the plunger 63 at one end by pressure fluid entering the space 56 of the servo master cylinder from the pedal operated master cylinder and in the other direction by displacement of the plunger 64 at the opposite end of the rocker by the pressure of the fluid in the space 55 which corresponds to the pressure in the brake circuit during brake operation, the pivotal axis of the rocker being so arranged that balance of the rocker 61 can be obtained when both plungers are subjected to their respective operating pressures.

The chamber 60 containing the rocker has an aperture 65 in an outer wall thereof which is closed by a flexible diaphragm 66 the diaphragm supporting a tubular movable member 67 operatively associated with the rocker 61 so as to be movable therewith. The tubular movable member 67 provides communication between the interior of the chamber and a casing 68 extending outwardly over the aperture 65 closed by the diaphragm 66. The interior of the casing 68 is open to atmosphere through holes 69 in the wall thereof an air filter (not shown) being provided to filter the incoming air. Located within the casing 68 is a normally closed poppet type air inlet valve 70 which divides the casing into an outer space 71 and an inner space 72, the air inlet holes 69 being provided adjacent the outer end of the casing for the entry of air into the outer space 71 thereof. The chamber 60 has a connection 73 for coupling the same to a source of vacuum the inner space 72 of the casing being normally in communication with the interior of the chamber 60 through the tubular valve member and with the working chamber 51 of the servo-device through a suitable pipe connection 74. The poppet valve 70 is used in conjunction with a larger air inlet valve consisting of a disc type valve 75 co-operating with a seating 76, the two valves being arranged in series so as to be operable one after the other.

FIGURE 7 shows the condition of the apparatus in the brake "off" position and FIGURE 8 in the brake "on" position. In operation when the pedal operated master cylinder is actuated hydraulic fluid therefrom entering the master cylinder space 56 acts on the appropriate plunger 63 to displace the same in a direction to effect tilting of the rocker 61 in one direction causing opposite displacement of the other plunger 64. This tilting movement of the rocker results in movement of the tubular movable member 67 and supporting diaphragm 66 the initial movement bringing the open end of the said member against the closure disc 77 carried by the stem 78 of the poppet air control valve 70 located in the casing, continued movement of the tubular movable member resulting in unseating of the normally closed poppet air inlet valve 70. The chamber 60 in which the rocker 61 is situated is thus cut off from the working chamber 51 of the servo-device and air enters the working chamber 51 through the control valve and pipe connection 74 between the inner space 72 of the casing and the said working chamber. As a result the servo-device is energised and upon movement of the push rod 52 the aperture in the piston of the servo master cylinder is closed by the ball 59 continued movement of the push rod 52 causing displacement of the piston 57 of the servo master cylinder. The fluid pressure in the brake circuit will therefore increase and acting on the appropriate plunger 64 will displace the same to tilt the rocker 61 in a direction opposing the tilting action of the first operated plunger 63. This will give a controlled relationship between outlet pressure to brake and inlet pressure from the pedal operated master cylinder. By providing a poppet air inlet valve of small size the effort required to unseat this is very small and also by making the diaphragm carrying the tubular movable member of corresponding small size the pressure required to crack the valve is very small, whereby a more sensitive operation of the device is obtained. In the event of rapid operation of the pedal operated master cylinder both the poppet valve and the disc valve will operate substantially simultaneously to admit a volume of air to effect rapid operation of the servo-device.

I claim:

1. A servo motor control means for use in a hydraulic braking system operated by a pneumatic pressure difference comprising a housing with a vacuum chamber therein adapted to communicate with a vacuum source, two spaced apart slidable plungers in said housing, one of said plungers being operated from the braking system secondary hydraulic pressure, the other of said plungers being operated from the braking system primary pressure, a pivot pin disposed in said housing, an elongated rocker arm mounted on said pivot pin for pivotal movement thereabout, said pivot pin being disposed at substantially right angles with respect to the longitudinal axis of said arm and the longitudinal axis of said plungers, the opposite ends of said arm being disposed in contact with said plungers for tilting movement by said plungers, a hydraulic cylinder in said housing in communication with each of said plungers for subjecting one plunger to the secondary hydraulic pressure and the other plunger to the primary hydraulic pressure, said vacuum chamber having an opening therein, a casing secured on said chamber over said opening, a hollow tubular valve member extending through said opening, a flexible diaphragm secured to said chamber and said tubular member, said tubular member being operatively connected to said rocker arm for movement in said opening by movement of said arm, annular seat means and a poppet valve in said casing dividing the casing into an outer air chamber and an inner vacuum chamber, said inner vacuum chamber being disposed adjacent said tubular member, said tubular member having an outer portion extending into said inner vacuum chamber and an inner portion extending into said vacuum chamber, said outer air chamber having an air inlet in communication with the atmosphere, said inner vacuum chamber having an outlet for communicating with a servo device to transmit pneumatic pressure thereto, a valve stem connected to said air poppet valve and extending into said inner vacuum chamber, a valve disc on said valve stem in said inner vacuum chamber adapted to seat on the outer portion of said tubular member to prevent flow through it, biasing means in said outer chamber normally urging said poppet valve in a closed position and seated on said annular seat means, said air poppet valve and said valve disc being positioned with respect to each other and with respect to said annular seat means and tubular member for seating of said valve disc on said tubular member, and thereafter opening of said poppet valve.

2. The control valve means of claim 1 wherein said poppet valve is disposed to be maintained in a closed position during a brake off position.

3. The control valve means of claim 1 wherein said poppet valve is substantially smaller than the cross sectional area of said casing to reduce the pressure required to open said poppet valve.

4. The control valve means of claim 1 wherein said tubular member and valve disc are of substantially smaller diameter than the diameter of said casing to reduce the pressure required to crack the valve.

5. The control valve means of claim 1 wherein said tubular member is substantially vertical, and said valve disc is disposed adjacent the upper end of said tubular member, and said air poppet valve is disposed on the upper end of said valve stem, above said valve disc.

References Cited by the Examiner

UNITED STATES PATENTS

| 2,383,682 | 8/45 | Price | 60—54.5 X |
| 2,532,462 | 12/50 | Rockwell | 60—54.6 |
| 2,853,977 | 9/58 | Sadler | 121—46.5 |
| 2,872,905 | 2/59 | Chouings | 121—46.5 |
| 2,883,830 | 4/59 | Stelzer | 60—54.6 |
| 2,915,047 | 12/59 | Bradbury | 121—46.5 |
| 2,976,686 | 3/61 | Stelzer | 60—54.6 |

JULIUS E. WEST, *Primary Examiner.*

ROBERT R. BUNEVICH, *Examiner.*